(12) United States Patent
Iijima

(10) Patent No.: US 8,045,090 B2
(45) Date of Patent: Oct. 25, 2011

(54) DISPLAY UNIT AND ELECTRONIC DEVICE

(75) Inventor: Takashi Iijima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 323 days.

(21) Appl. No.: 12/146,945

(22) Filed: Jun. 26, 2008

(65) Prior Publication Data

US 2009/0009681 A1    Jan. 8, 2009

(30) Foreign Application Priority Data

Jul. 2, 2007    (JP) ................ 2007-174451

(51) Int. Cl.
*G02F 1/1333* (2006.01)
(52) U.S. Cl. ............... 349/60; 349/58; 349/59
(58) Field of Classification Search ......... 349/58–60
See application file for complete search history.

(56) References Cited

U.S. PATENT DOCUMENTS

| | | | |
|---|---|---|---|
| 7,113,237 B2 * | 9/2006 | Nitto et al. ......... | 349/58 |
| 7,580,627 B2 * | 8/2009 | Kamei ......... | 396/312 |
| 2007/0002206 A1 | 1/2007 | Shirai | |

FOREIGN PATENT DOCUMENTS

| | | |
|---|---|---|
| JP | 11-311952 | 11/1999 |
| JP | 2007-010818 | 1/2007 |
| JP | 2007-013050 | 1/2007 |

\* cited by examiner

*Primary Examiner* — Phu Vu
(74) *Attorney, Agent, or Firm* — Staas & Halsey LLP

(57) ABSTRACT

A display unit has a display module and a housing case holding the display module. The housing case has a first member made of an electrically conductive material and a second member. The second member has an inner edge portion superposed with an outer edge portion of the first member and is made of an electrically nonconductive material. The second member is positioned outside the first member and is fixed to the first member. The first member has a step in its outer edge portion. The step extends over a whole area superposed with the second member. The step has an inner wall protruding and end outer wall dented as compared with a middle portion inside the outer edge portion of the first member. The second member has an inner edge portion arranged in a recess of the outer wall of the step.

10 Claims, 9 Drawing Sheets

DISPLAY UNIT AND ELECTRONIC DEVICE

CROSS-REFERENCE TO RELATED APPLICATIONS

This application is based upon and claims the benefit of priority from the prior Japanese Patent Application No. 2007-174451 filed on Jul. 2, 2007, the entire contents of which are incorporated herein by reference.

BACKGROUND OF THE INVENTION

1. Field of the Invention

Liquid crystal panels, which are flat display screens for displaying information, are widely used in fields such as the personal computer field. Backlight type display units are widely used in laptop personal computers, cellular phones and the like, for which reduction in thickness of the device is especially strongly needed. In backlight type display units, a liquid crystal panel is irradiated from the back side with light.

2. Description of the Related Art

A light source extending in the form of a line is arranged on the side surface of a liquid crystal panel in a backlight type display unit. In addition, a backlight type display unit has a light guide plate bonded to the back surface of the liquid crystal panel. In such a backlight type display unit, light generated from the light source is guided by the light guide plate to the liquid crystal panel. The light is then further diffused by the light guide plate to be radiated from the back side of the liquid crystal panel. According to such a backlight type display unit, the light source and the like are arranged beside the liquid crystal panel, where space is relatively abundant. Therefore, the display unit is flat.

A display unit using a liquid crystal panel generally accommodates the liquid crystal panel. A backlight, a drive board and the like are attached to the display unit, which is placed in a housing for purposes such as good appearance. The entire housing is preferably composed of a strong metal or the like in order to reduce the thickness and weight of the device, and also to protect the breakable liquid crystal panel from impact such as falling.

Recently, laptop personal computers have been equipped with a wireless communication function. Such a personal computer often has an antenna for wireless communication installed beside the liquid crystal panel. Therefore, if the entire housing of the personal computer were made of metal, which is an electrically conductive material, the antenna would be unable to transmit and receive electric waves. For this reason, a housing is used which has a first member composed of a strong metal. A second member composed of plastic or the like which permits electric waves to pass is fixed around the first member. Such a housing contains the liquid crystal panel in the first member portion and contains the antenna or the like in the second member portion.

An example of a method for fixing the first member to the second member is to superpose and screw together the outer edge of the first member and the inner edge of the second member. However, according to this method, light of the backlight may leak from the gap between the first member and the second member. This impairs the feeling of luxury or the impression of high quality with the personal computer.

Japanese Patent Laid-Open No. 11-311952 is known as a reference for alleviating leakage of light of the backlight. This reference discloses a housing in which a rear surface member made of metal is fixed to a front surface member made of plastic.

The rear surface member covers the rear surface of the liquid crystal panel, while the front surface member surrounds the front surface side of the liquid crystal panel. The rear surface member has a surface contacting the front surface member in the form of a slope. The front surface member has an outer edge which is bent. The front surface member is screwed to the slope of the rear surface member through the bent portion. Adherence of the superposed portion of the front surface member to the rear surface member is improved in this way, and leakage of light of the backlight in the housing can be alleviated.

This reference does not configure the rear surface side housing case in the form of one plate by a plurality of members of different materials. In this reference, the rear surface member, which is made of metal, is fixed to the front surface member, which is made of plastic, at the side surface of the liquid crystal panel. Therefore, the rear surface of the liquid crystal panel is covered by the metal rear surface member, so that an antenna for wireless communication cannot be disposed in the upper housing.

This problem occurs not only in personal computers and cellular phones but generally in display units accommodating a backlight type display panel in the housing.

SUMMARY

According to an aspect of an embodiment, a display unit has a display module having a display screen for displaying information and a backlight light source for irradiating the display screen from a rear surface side of the display screen, and a housing case holding the display module, wherein the housing case has a first member covering a rear surface of the display module and made of an electrically conductive material, and a second member has an inner edge portion superposed with an outer edge portion of the first member and is made of an electrically nonconductive material, the second member being positioned outside the first member and fixed to the first member, the first member having in its outer edge portion a step over a whole area superposed with the second member, the step having its inner wall protruding and its outer wall dented as compared with a middle portion inside the outer edge portion of the first member, and the second member having its inner edge portion arranged superposed in a recess of the outer wall of the step.

These together with other aspects and advantages which will be subsequently apparent, reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

Figure 1:
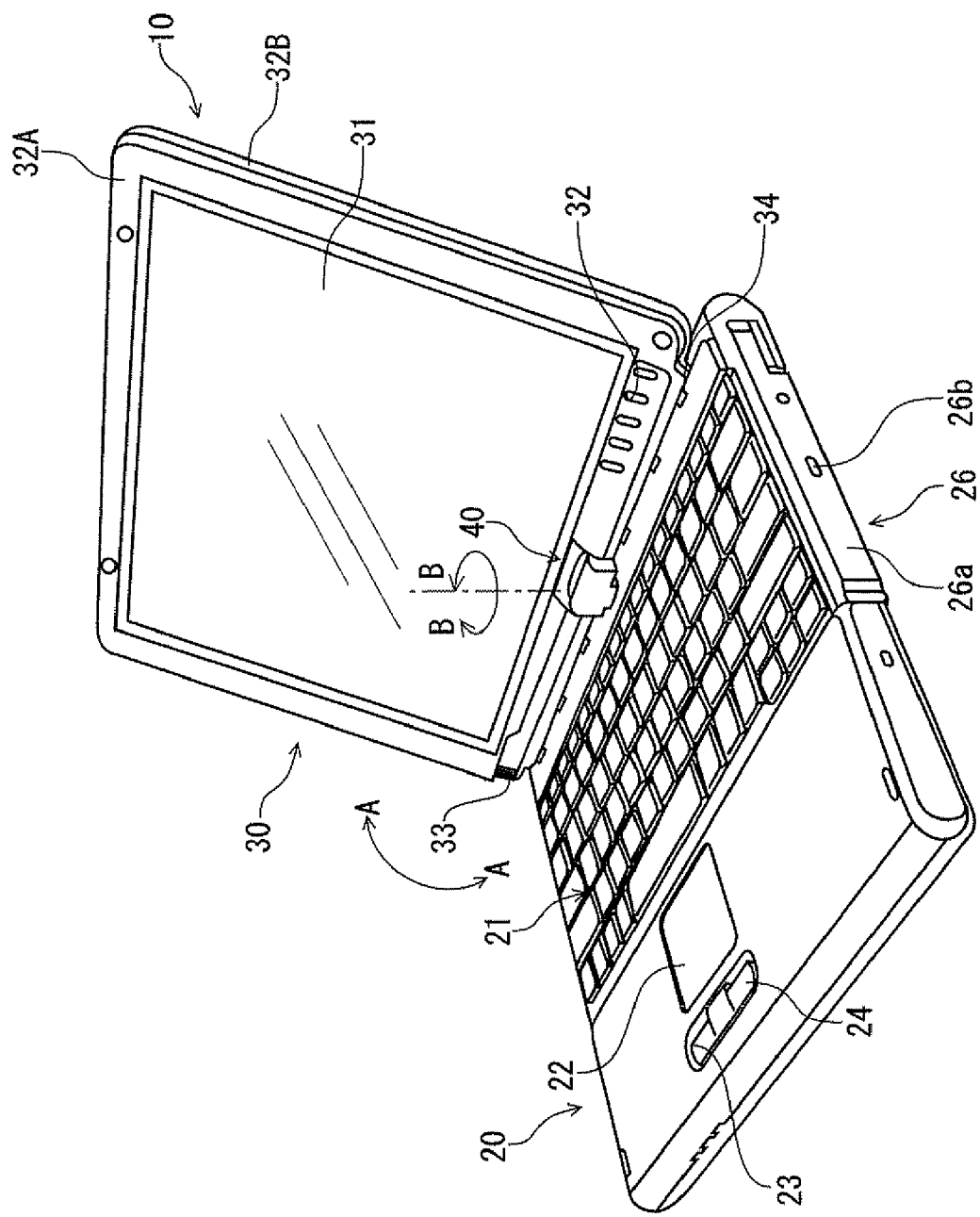
FIG. 1 is a perspective view of the appearance of a personal computer which is an embodiment of the present electronic device.

Reference may now be made in detail to embodiments of the present invention, examples of which are illustrated in the accompanying drawings, wherein like reference numerals refer to like elements throughout.

Hereafter, an embodiment of the present electronic device will be described with reference to the drawings.

FIG. 1 is a perspective view of the appearance of a personal computer which is an embodiment of the present electronic device.

The personal computer 10 shown in FIG. 1 has as an input device an electromagnetic induction type digitizer mounted on the back side of a display screen 31. The digitizer detects the position indicated by a stylus on the display screen 31. By such a configuration, the personal computer 10 enables input by indication. This input device may be a touch panel mounted on the display screen 31, instead of the digitizer and stylus.

The personal computer 10 has a main body unit 20 and a display unit 30. The display unit 30 is connected to the main body unit 20 by a biaxial connector unit 40. The biaxial connector unit 40 allows the display unit 30 to be opened and closed in the direction of an arrow A-A, and rotatable in the direction of an arrow B-B (about a rotational axis perpendicular to the main body unit 20) with respect to the main body unit 20.

In FIG. 1, the personal computer 10 is shown in a state in which the display unit 30 is opened with respect to the main body unit 20 (an open state). This open state corresponds to a first state of use. The main body unit 20 is an example of a processing unit. The display unit 30 is an example of a display unit.

The main body unit 20 has a keyboard 21, a track pad 22, a left click button 23 and a right click button 24. The main body unit 20 further has a display unit receiving member 34 which receives the display unit 30 from below. The display unit receiving member 34 corresponds to an example of a receiving member.

The main body unit 20 also has an opening and closing cover 26a on one side thereof. The opening and closing cover 26a is for an optical disk drive 26 in which an optical disk such as a CD or DVD is mounted to be driven and accessed. The opening and closing cover 26a has an eject button 26b which is pressed to open the opening and closing cover 26a.

The display unit 30 of the personal computer 10 has a display screen 31 on the front surface thereof. The display unit 30 has several press buttons 32 on the right end below the display screen 31. The display unit 30 also has a fingerprint sensor 33 on the left end thereof which performs fingerprint authentication. The fingerprint sensor 33 performs fingerprint authentication by being traced with a fingertip.

In the display unit 30, the display screen 31 is sandwiched on the front and rear sides by a front casing 32A and a rear casing 32B. A later-described antenna for performing communication or the like is accommodated in the space defined by the casings. The front casing 32A is an example of a front casing. The rear casing 32B is an example of a housing casing. In the open state shown in FIG. 1, information is displayed on the display screen 31 with the direction of the rotational axis of the display unit 30 as the up-and-down direction.

Figure 2:
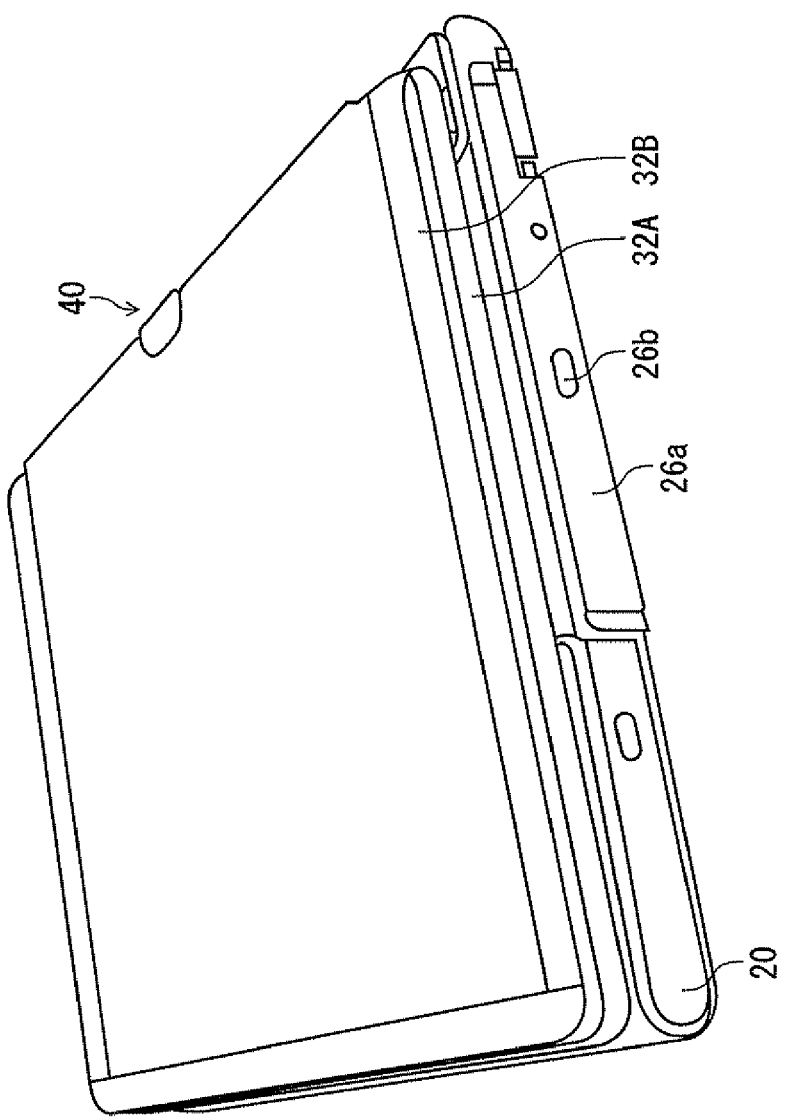
FIG. 2 is a perspective view showing the appearance of the personal computer with a display unit closed over a main body unit.

FIG. 2 is a perspective view showing the appearance of the personal computer with the display unit closed over the main body unit. In FIG. 2, the display unit 30 is in a state of being overlaid on the main body unit 20 with the display screen 31 (see FIG. 1) facing the main body unit 20. Hereafter, this state is referred to as a first closed state.

Upon closing the display unit 30 along the direction of the arrow A from the open state shown in FIG. 1, the personal computer 10 is in the first closed state. In the first closed state, the display screen 31 is hidden inside and the back surface with respect to the display screen 31 is exposed outside, as shown in FIG. 2. The personal computer 10 can avoid staining or breakage of the display screen 31 in the first closed state, providing portability.

Figure 3:
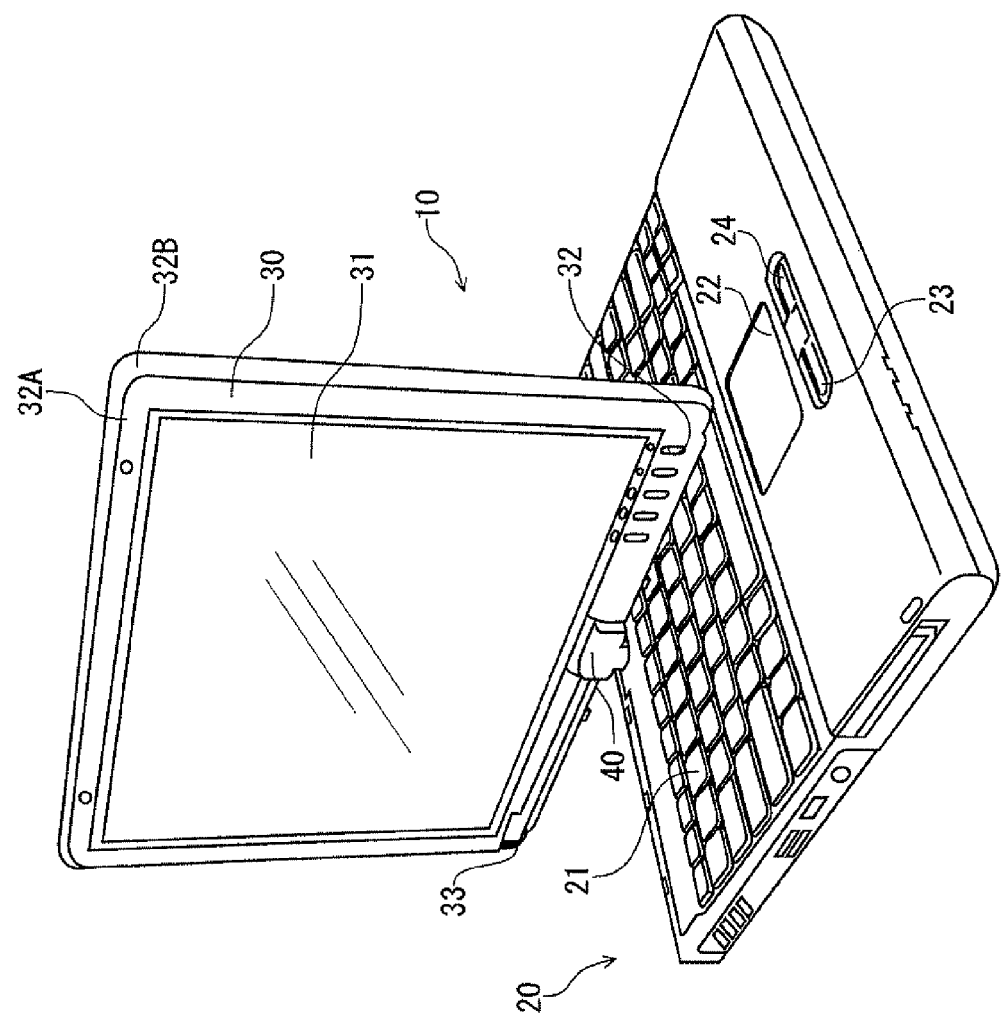
FIG. 3 is a perspective view showing the appearance of the personal computer with the display unit rotated substantially 90 degrees with respect to the main body unit.

FIG. 3 is a perspective view showing the appearance of the personal computer with the display unit rotated substantially 90 degrees with respect to the main body unit. The display unit 30 of the personal computer 10 can be rotated from the state shown in FIG. 1 via the state shown in FIG. 3 until the back side of the display screen 31 faces the front.

Figure 4:
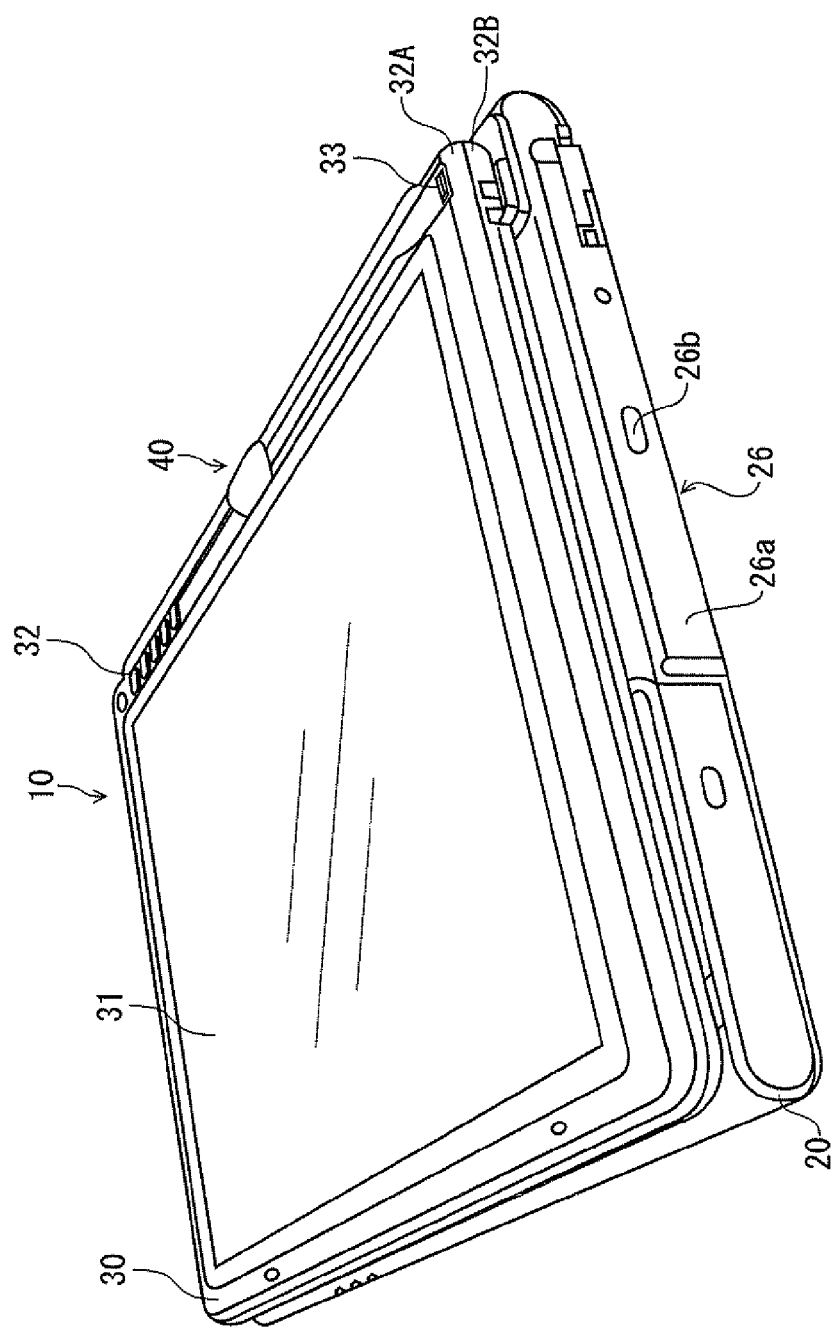
FIG. 4 is a perspective view showing the appearance of the personal computer, the display unit being overlaid on the main body unit with the display screen facing upward.

FIG. 4 is a perspective view showing the appearance of the personal computer, the display unit being overlaid on the main body unit with the display screen facing upward.

The personal computer 10 is in a second closed state shown in FIG. 4 when the display unit 30 is overlaid on the main body unit. In the second closed state, the back surface of the display unit 30 with respect to the display screen 31 is facing the main body unit 20 after the display unit 30 has been rotated from the state shown in FIG. 1 via the state shown in FIG. 3 until the back side of the display screen 31 faces the front. This second closed state is an example of a second state of use. Hereafter, "tablet mode" refers to an operation mode where the personal computer 10 is used in the second closed state.

As described above, the display screen 31 is a display screen with a pen input function. The display screen 31 has an electromagnetic induction type digitizer on a back side thereof for detecting the indicated position on the display screen. Usually, a user holds the personal computer 10 in one of his/her arms when it is in the tablet mode, and operates the display screen with a stylus (not shown) in the other hand. The displayed image on the display screen 31 is rotated 90 degrees from the open state shown in FIG. 1. That is, in the tablet mode, information is displayed on the display screen 31 with a direction perpendicular to the rotational axis of the display unit 30 as the up-and-down direction.

Next, the internal configuration of the personal computer 10 will be described.

Figure 5:
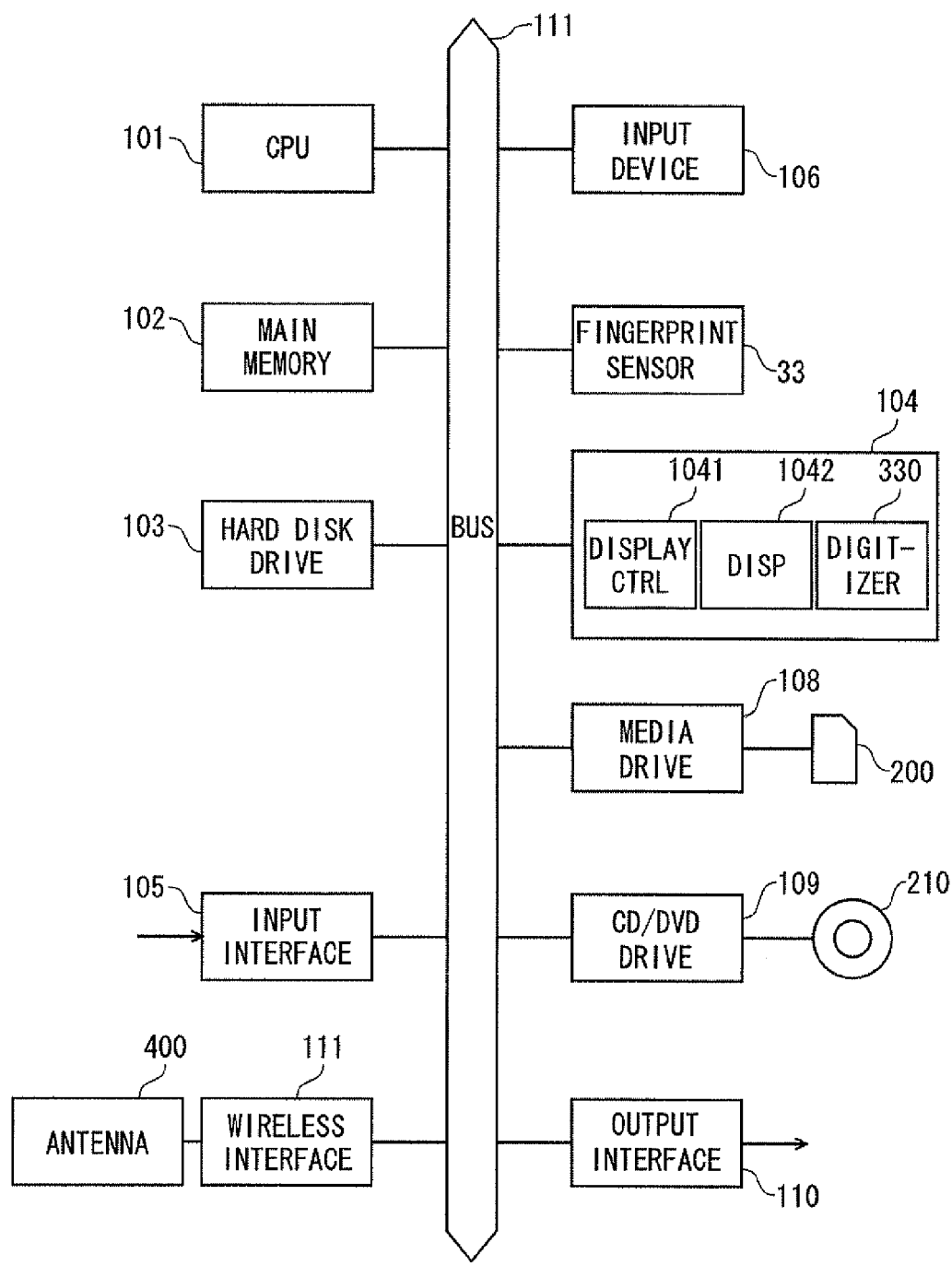
FIG. 5 is an internal configuration diagram of the personal computer.

FIG. 5 is an internal configuration diagram of the personal computer 10.

As shown in FIG. 5, the personal computer 10 contains a CPU 101, a main memory 102, a hard disk drive 103, a display mechanism 104, a fingerprint sensor 33 (shown in FIG. 1), an input device 106, a small recording media drive 108, a CD/DVD drive 109, an input interface 105, an output interface 110, an antenna 400, a wireless interface 111 and the like. The various elements contained in the personal computer 10 are interconnected via bus 111.

The CPU 101 executes various programs. Programs read from the hard disk drive 103 are developed in the main memory 102 for execution by the CPU 101. The hard disk drive 103 stores various programs, data and the like. The display mechanism 104 conducts processes relating to displaying information.

The input device 106 comprises the keyboard 21, the track pad 22 and the like. The small recording media drive 108 accesses a small recording medium 200 loaded therein. The CD/DVD drive 109 accesses a CD-ROM 201 or DVD loaded therein. The input interface 105 inputs data from external devices. The output interface 110 outputs data to external devices.

The antenna 400 transmits and receives radio waves. The wireless interface 111 performs wireless communication using the antenna 400. The display mechanism 104 is comprised of a display controller 1041, a display 1042 and a digitizer 1043. The display controller 1041 controls the direction and the like of information displayed on the display screen 31 shown in FIG. 1. The display 1042 displays information on the display screen 31.

The digitizer 1043 is mounted on the back side of the display screen 31 and detects the position indicated by a stylus. The display controller 1041 corresponds to an example of a display control unit. The antenna 400 corresponds to an example of an electronic component and also corresponds to an example of an antenna.

Next, the internal configuration of the display unit 30 will be described in detail.

Figure 6:
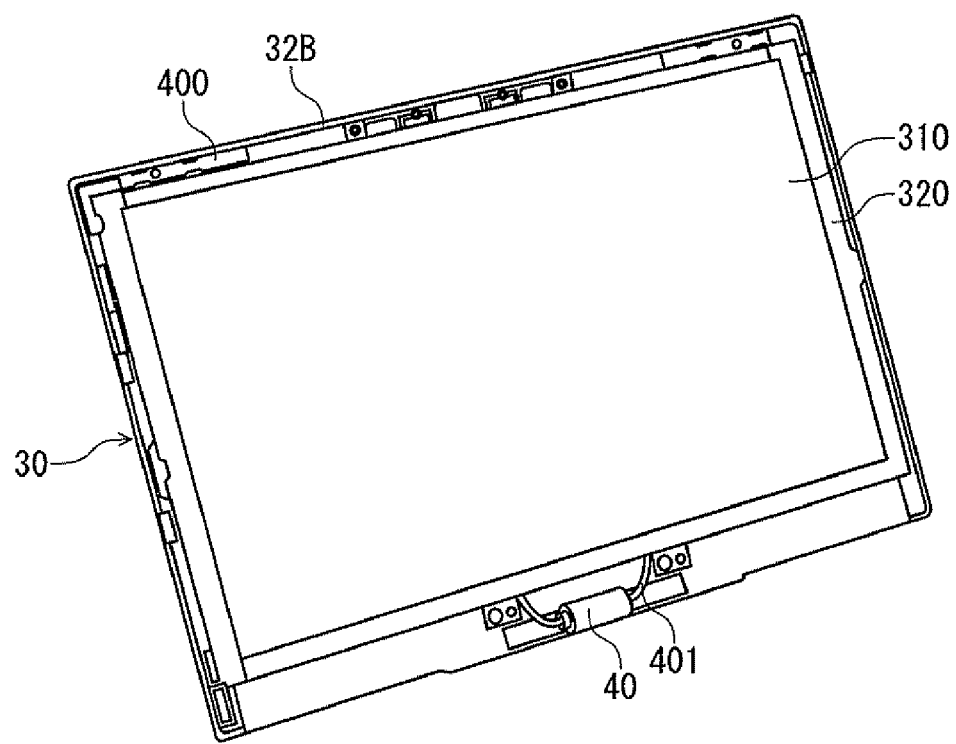
FIG. 6 is a view showing the display unit 30 with a front cover shown in FIG. 1 removed.

FIG. 6 is a view showing the display unit 30 with the front cover 32A shown in FIG. 1 removed.

A display panel 310 shown in FIG. 6 has on its surface the display screen 31 shown in FIG. 1. A digitizer 330 (see FIG. 7) is arranged on the back side of the display panel 310. In addition, resilient members 320 are attached on both side edges of the display panel 310.

The display panel 310 is accommodated in the rear cover 32B of the display unit 30 with the resilient members 320 attached thereto. An antenna 400 for transmitting and receiving electric waves is attached in the upper portion of the rear cover 32B of the display unit 30. A signal line 401 is connected to the antenna 400. The signal line 401 extends from the antenna 400 through the connector member 40 to be connected to the CPU 101 (see FIG. 5) in the main body unit 20 shown in FIG. 1.

Figure 7:
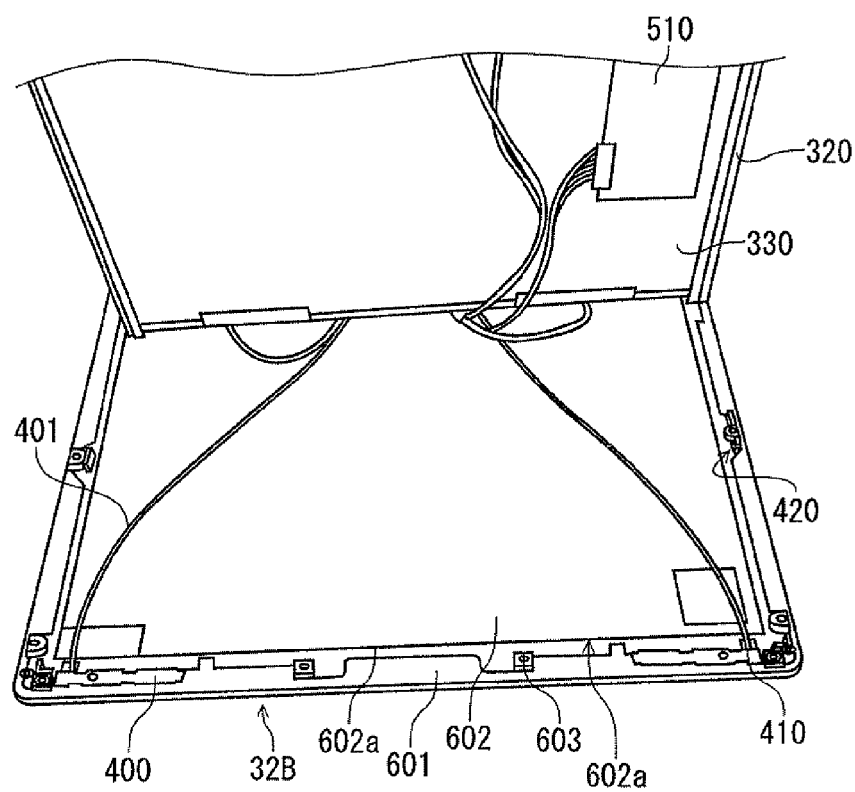
FIG. 7 is a view showing the display unit with the display panel removed from a rear cover together with the resilient member.

FIG. 7 is a view showing the display unit 30 with the display panel 310 removed from the rear cover 32B together with the resilient members 320.

A backlight light source (not shown) is embedded in the lower edge of the display panel 310. A light guide plate (not shown) is bonded to the back side of the display panel 310. The light guide plate guides light generated from the backlight light source for diffuse radiation on the back side of the display panel 310. In addition, the digitizer 330 shown in FIG. 5 is also bonded to the back side of the display panel 310. The display unit 30 has a transmission circuit 510 for transmitting information detected by the digitizer 330 to the main body unit 20.

A panel portion 602 of the rear cover 32B covering the back surface of the display panel 310 is composed of metal. On the other hand, an antenna portion 601 of the rear cover 32B is composed of plastic. The antenna 400 and the signal line 401 shown in FIG. 6 are disposed in the antenna portion 601. The antenna portion 601 is joined by a screw 603 to the panel portion 602. The panel portion 602 corresponds to an example of a first member. The antenna portion 601 corresponds to an example of a second member.

The strength of the rear cover 32B is improved by the panel portion 602 being metal (for example, a magnesium alloy), which is an electrically conductive material. Consequently, the impact resistance of the display panel 310 is improved. Meanwhile, since the antenna portion 601 is plastic, which is an electrically nonconductive material, the antenna 400 can reliably transmit and receive electric waves. Consequently, wireless communication is reliably carried out.

Figure 8:
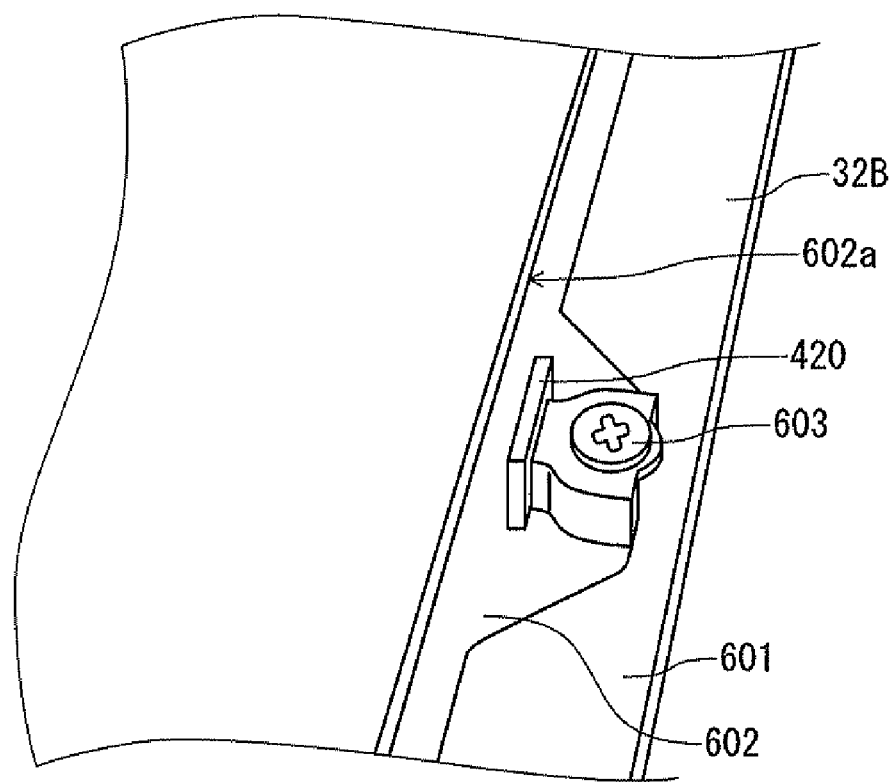
FIG. 8 is an enlarged view of the display unit showing the border of a panel portion and an antenna portion.

FIG. 8 is an enlarged view of the display unit showing the border of the panel portion 602 and the antenna portion 601. The antenna portion 601 has its inner edge superposed with the outer edge of the panel portion 602. The antenna portion 601 is fixed at its superposed portion to the panel portion 602 by the screw 603. The panel portion 602 has a step 602a in its outer edge side.

Figure 9:
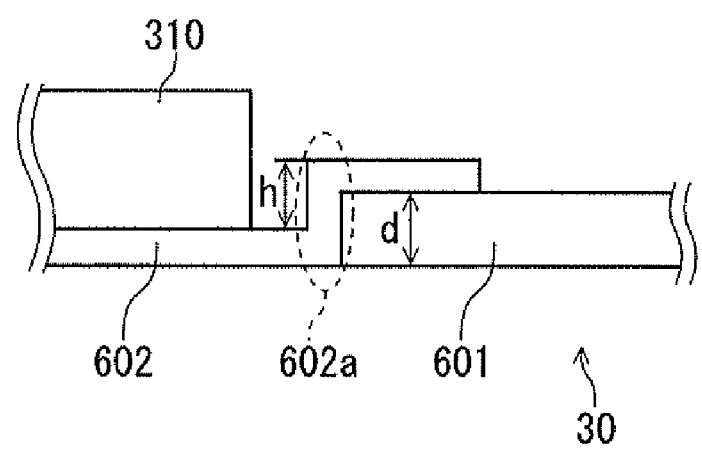
FIG. 9 is a view of the display unit showing a section of a step.

FIG. 9 is a view of the display unit 30 showing a section of the step 602a.

The step 602a is formed by the middle portion of the panel portion 602 and the outer edge side portion of the panel portion 602 protruding with respect to that middle portion to the inner surface side where the display panel 310 is accommodated. The antenna portion 601 abuts to the recess formed at the outer wall of the step 602a. In the present embodiment, the height h of the step 602a of the panel portion 602 is substantially equal to the thickness d of the antenna portion 601. The display unit 30 has the antenna portion 601 smoothly joining with the panel portion 602 as viewed from the back side of the display panel 310.

When light generated from the backlight light source irradiates the display panel 310 from the back side, portions of that light leak from the rear surface side of the display panel 310. However, since the step 602a of the panel portion 602 blocks the leaking light, a problem can be prevented that light should leak out from the rear cover 32B.

In the present embodiment the panel portion 602 is composed of a strong metal. Thus, the panel portion 602 can be configured to be thinner than the antenna portion 601 composed of plastic. For these reasons, the height of the step can be higher than would be if that step were provided in the antenna portion 601 side. Thus, the step reliably blocks light generated from the backlight light source. Consequently, the present embodiment prevents light leakage with good accuracy.

In addition, since the step is provided not in the antenna portion 601 but in the panel portion 602 side, the screw 603 (see FIG. 8) is fixed from the front surface side of the rear cover 32B. As a result, the present embodiment improves the design quality of the display unit.

Although the above embodiment explains an example in which the electronic device is a personal computer having the tablet mode, it may be a personal computer not equipped with the tablet function. The electronic device may also be an electronic organizer or the like.

Although the above embodiment explains as a housing case an example in which a housing case has a first member the outer periphery of which is surrounded over a full circle by a second member, a second member may be fixed to a portion of the outer edge of a first member.

Although a few preferred embodiments of the present invention have been illustrated and described, it would be appreciated by those skilled in the art that changes may be made in these embodiments without departing from the principles and spirit of the invention, the scope of which is defined in the claims and their equivalents.

Further, according to an aspect of the embodiments, any combinations of the described features, functions and/or operations can be provided.

Further, according to an aspect of the embodiments, any combinations of the described features, functions and/or operations can be provided.

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

The invention claimed is:

1. A display unit, comprising:
a display module having a display screen for displaying information and a backlight light source for irradiating the display screen from a rear surface of the display screen; and
a housing case holding the display module,
wherein the housing case has
a first member covering a rear surface of the display module, the first member being made of an electrically conductive material, and
a second member having an inner edge portion superposed with an outer edge portion of the first member, the second member being made of an electrically nonconductive material, the second member being positioned outside the first member and being fixed to the first member,
the first member having a step in the outer edge portion, the step extending over a whole area superposed with the second member, the step having an inner wall protruding and an outer wall dented compared to a middle portion inside the outer edge portion of the first member, and
the second member having an inner edge portion arranged in a recess of the outer wall of the step.

2. The display unit according to claim 1, further comprising a front side case covering a border of an edge of the display module held in the housing case and an edge of the housing case.

3. The display unit according to claim 1, wherein the outer edge portion of the first member has a step of a height substantially equal to a thickness of the second member.

4. The display unit according to claim 1, wherein the second member is fixed to the first member by being screwed thereto.

5. The display unit according to claim 1, further comprising an electronic component positioned in a portion formed by the second member in the housing case.

6. The display unit according to claim 5, wherein the electronic component has a wireless antenna.

7. An electronic device, comprising:
a display unit; and
an information processing circuit generating display information and transmitting display information to a display module of the display unit,
the display unit comprising:
a display module having a display screen for displaying information and a backlight light source for irradiating the display screen from the rear surface side of the display screen; and
a housing case holding the display module,
wherein the housing case has
a first member covering a rear surface of the display module, the first member being made of an electrically conductive material, and
a second member having an inner edge portion superposed with an outer edge portion of the first member, the second member being made of an electrically nonconductive material, the second member being positioned outside the first member and being fixed to the first member,
the first member having a step in an outer edge portion, the step extending over a whole area superposed with the second member, the step having an inner wall protruding and an outer wall dented compared to a middle portion inside the outer edge portion of the first member, and
the second member having an inner edge portion arranged in a recess of the outer wall of the step.

8. The electronic device according to claim 7, further comprising a processing unit containing the information processing circuit,
wherein the display unit is connected to the processing unit so as to be openable and closable.

9. The electronic device according to claim 8, wherein the display unit is connected to the processing unit through a biaxial connector member, the display unit being openable and closable with respect to the processing unit, and the display unit being rotatable about a rotational axis perpendicular to an upper surface of the processing unit, in an open state.

10. The electronic device according to claim 9, further comprising a display switching circuit having a first display mode and a second display mode and displaying information according to each mode, wherein
the first display mode is a mode to display information on the display screen with a direction of the rotational axis as an up-and-down direction in a first state of use in which the display unit is opened with respect to the processing unit,
the second display mode is a mode to display information on the display screen with a direction perpendicular to the rotational axis as an up-and-down direction in a second state of use in which the display unit is overlaid on the processing unit with the display screen facing outside.

* * * * *